United States Patent
Washizu et al.

(10) Patent No.: US 10,646,995 B2
(45) Date of Patent: May 12, 2020

(54) ROBOT THAT CARRIES OUT LEARNING CONTROL IN APPLICATIONS REQUIRING CONSTANT SPEEDS, AND CONTROL METHOD THEREOF

(71) Applicant: FANUC CORPORATION, Yamanashi (JP)

(72) Inventors: Shinichi Washizu, Yamanashi (JP); Hajime Suzuki, Yamanashi (JP); Kaimeng Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 74 days.

(21) Appl. No.: 16/018,078

(22) Filed: Jun. 26, 2018

(65) Prior Publication Data

US 2019/0001490 A1    Jan. 3, 2019

(30) Foreign Application Priority Data

Jul. 3, 2017  (JP) ................................. 2017-130514

(51) Int. Cl.
*G06F 19/00*  (2018.01)
*B25J 9/16*  (2006.01)

(52) U.S. Cl.
CPC ............. *B25J 9/163* (2013.01); *B25J 9/1651* (2013.01); *B25J 9/1664* (2013.01); *B25J 9/1674* (2013.01)

(58) Field of Classification Search
CPC ........ B25J 9/163; B25J 9/1651; B25J 9/1664; B25J 9/1674
USPC .................................................. 700/245, 253
See application file for complete search history.

(56) References Cited

U.S. PATENT DOCUMENTS

| | | | | |
|---|---|---|---|---|
| 4,926,105 A | * | 5/1990 | Mischenko | ............. H02P 21/06 318/800 |
| 8,306,635 B2 | * | 11/2012 | Pryor | ..................... B60K 35/00 700/17 |
| 2012/0296471 A1 | * | 11/2012 | Inaba | ....................... B25J 9/163 700/253 |
| 2014/0107390 A1 | * | 4/2014 | Brown | ................. A61N 5/1045 600/1 |
| 2014/0288525 A1 | | 9/2014 | Fudaba et al. | |

(Continued)

FOREIGN PATENT DOCUMENTS

| | | |
|---|---|---|
| JP | H5-108108 A | 4/1993 |
| JP | H8-16225 A | 1/1996 |
| JP | H10-225885 A | 8/1998 |

(Continued)

*Primary Examiner* — Ronnie M Mancho
(74) *Attorney, Agent, or Firm* — Hauptman Ham, LLP (57) ABSTRACT

A control device repeats learning of: calculating an allowable condition for speed variations during a processing operation based on an allowable condition for processing error; setting an operating speed change rate used to increase or reduce an operating speed of a robot mechanism unit using a calculated allowable condition for speed variations; and, while increasing or reducing the operating speed change rate over a plurality of repetitions within a range not exceeding a maximum value of the operating speed change rate and within a range of an allowable condition for vibrations occurring in a control target, calculates a new correction amount based on an amount of difference between a position of the control target detected based on a sensor and a target position, and a previously-calculated correction amount.

11 Claims, 4 Drawing Sheets

(56) References Cited

U.S. PATENT DOCUMENTS

2017/0106542 A1  4/2017  Wolf et al.

FOREIGN PATENT DOCUMENTS

| JP | 2011-167817 A | 9/2011 |
| JP | 2012-240142 A | 12/2012 |
| JP | 2013-41478 A | 2/2013 |
| JP | 2016-137529 A | 8/2016 |
| WO | 2014/010207 A1 | 1/2014 |

* cited by examiner

ROBOT THAT CARRIES OUT LEARNING CONTROL IN APPLICATIONS REQUIRING CONSTANT SPEEDS, AND CONTROL METHOD THEREOF

RELATED APPLICATIONS

The present application claims priority of Japanese Application Number 2017-130514, filed on Jul. 3, 2017, the disclosure of which is hereby incorporated by reference herein in its entirety.

BACKGROUND OF THE INVENTION

1. Field of the Invention

The present invention relates to robot control techniques, and particularly relates to a robot that carries out learning control in applications requiring constant speeds, and to a control method thereof.

2. Description of the Related Art

Accelerating robot operations and shortening tact time lead directly to production efficiency. However, in a case where robot operations are accelerated beyond a certain degree, factors such as insufficient rigidity of reduction gears and of the robot arm cause vibrations to arise in the robot tip. A method for carrying out learning control of vibrations in the robot tip by attaching a sensor to the robot tip and measuring vibrations during operations while accelerating the robot operations has been proposed as a method for addressing this problem (e.g., see JP 2011-167817 A).

SUMMARY OF THE INVENTION

In applications such as laser machining and sealing, it is preferable that the speed of the tool tip be kept constant during the processing; however, even in a case where operations are taught to be carried out at a constant speed, vibrations may arise in a case where the speed drops at corners due to acceleration/deceleration limitations of the motors, reduction gears, and the like, or in a case where sudden acceleration/deceleration is used to keep a constant speed in operations at corners. Vibrations worsen the quality of processing in laser machining and sealing, but teaching an operation program that maintains a constant speed without vibration requires trial and error on the part of the teacher, which has led to increased work time.

Therefore, there is a need for a technique of carrying out learning control in applications requiring constant speeds.

One aspect of the present disclosure provides a robot including: a robot mechanism unit provided with a sensor for detecting a position of a control target, the control target being a target of position control; and a control device configured to control an operation of the robot mechanism unit in accordance with an operation program, wherein the control device includes: a learning control unit configured to cause the robot mechanism unit to operate according to an operation command pertaining to a target trajectory or a target position of the control target, and to learn calculating an amount of difference between the position of the control target detected based on the sensor and the target position, and calculating a new correction amount based on the amount of difference and a previously-calculated correction amount for bringing the position of the control target closer to the target position; and a robot control unit configured to be supplied with the operation command, and to control the operation of the robot mechanism unit using the supplied operation command and the new correction amount calculated by the learning control unit, and the learning control unit includes: an operating speed change rate adjusting section configured to calculate an allowable condition for speed variations arising during a processing operation to be carried out in accordance with the operation program, based on an allowable condition for processing error in the processing operation, to set an operating speed change rate used to increase or reduce an operating speed of the robot mechanism unit using the calculated allowable condition for speed variations, and to increase or reduce the operating speed change rate over a plurality of repetitions within a range not exceeding a maximum value of the operating speed change rate and within a range of an allowable condition for vibrations occurring in the control target; a correction amount calculating section configured to calculate the new correction amount to suppress the vibrations in the operating speed change rate each time; and a memory configured to, after the correction amount and the operating speed change rate have converged, store a convergent correction amount and operating speed change rate.

Another aspect of the present disclosure provides a control method of a robot, the robot including: a robot mechanism unit and a control device, the robot mechanism unit provided with a sensor for detecting a position of a control target, the control target being a target of position control, the control device being configured to control an operation of the robot mechanism unit in accordance with an operation program, the control method including: calculating an allowable condition for speed variations arising during a processing operation to be carried out in accordance with the operation program, based on an allowable condition for processing error in the processing operation; causing the robot mechanism unit to operate in accordance with an operation command pertaining to a target trajectory or a target position of the control target, and setting an operating speed change rate used to increase or reduce an operating speed of the robot mechanism unit using the calculated allowable condition for speed variations; calculating an amount of difference between the position of the control target detected based on the sensor and the target position; increasing or reducing the operating speed change rate over a plurality of repetitions within a range not exceeding a maximum value of the operating speed change rate and within a range of an allowable condition for vibrations occurring in the control target; repeating learning of calculating a new correction amount based on the amount of difference and a previously-calculated to suppress vibrations in the operating speed change rate each time; and storing, after the correction amount and the operating speed change rate have converged, a convergent correction amount and operating speed change rate.

DETAILED DESCRIPTION

An embodiment of the present disclosure will be described in detail below with reference to the accompanying drawings. In the drawings, identical or similar constituent elements are given identical or similar reference signs. Additionally, the embodiment described below is not intended to limit the technical scope of the invention or the meaning of terms set forth in the claims.

Figure 1:
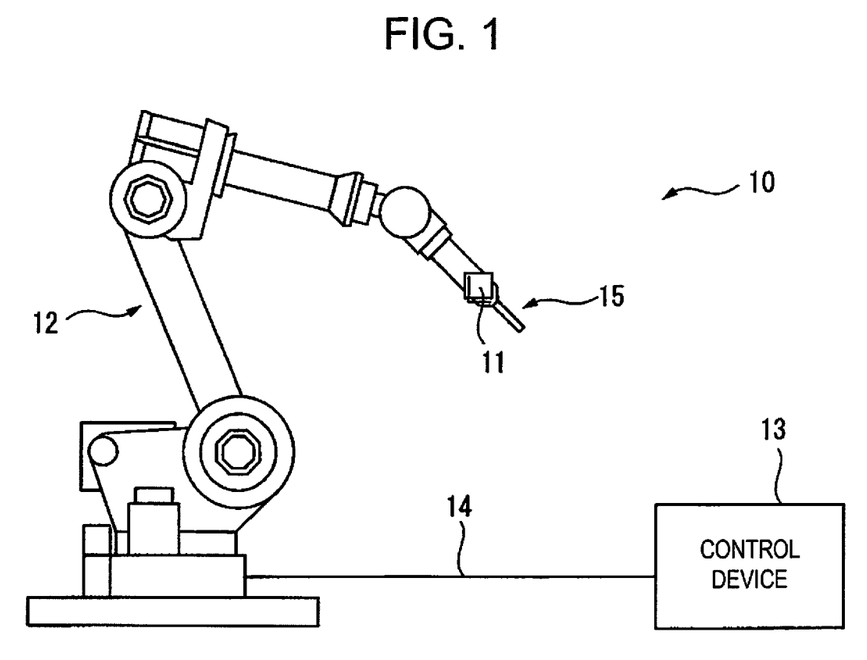
FIG. 1 is a schematic diagram of a robot according to one embodiment.
Figure 2:
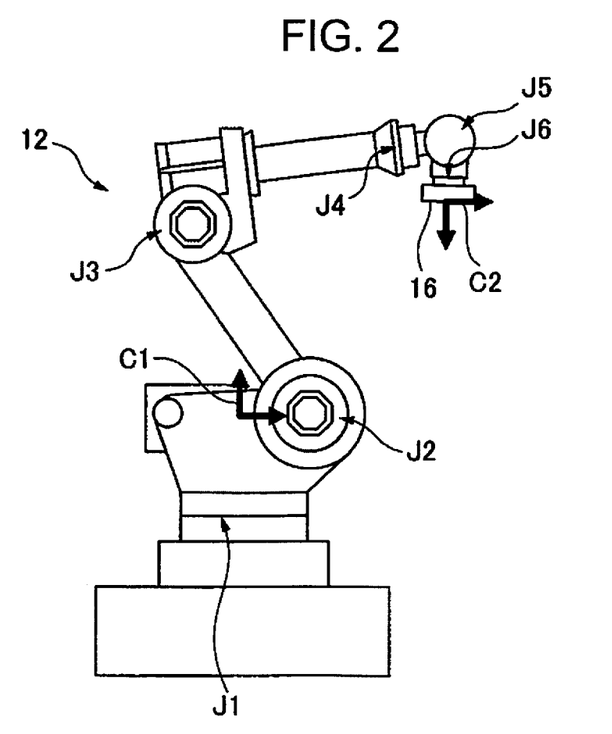
FIG. 2 is a schematic diagram of a robot mechanism unit according to one embodiment.

FIG. 1 is a schematic diagram of a robot 10 according to the present embodiment, and FIG. 2 is a schematic diagram of a robot mechanism unit 12 according to the present embodiment. As illustrated in FIG. 1, the robot 10 includes the robot mechanism unit 12, which is provided with a sensor 11 for detecting the position of a control target that is a target for position control, and a control device 13 that controls operations of the robot mechanism unit 12 in accordance with an operation program. The sensor 11 can communicate with the control device 13 over a wire or wirelessly, and the robot mechanism unit 12 can communicate with the control device 13 over a cable 14.

The sensor 11 is an accelerometer that is attached to a robot tip 15, which is an example of the control target, and that detects acceleration of the robot tip 15 in three axial directions. A three-axis acceleration detected by the sensor 11 is converted into a three-dimensional position by the control device 13. As long as the three-dimensional position of the robot tip 15 can ultimately be calculated, the sensor 11 may obtain data aside from acceleration, e.g., a position, a speed, an angular speed, a force, a travel time of a laser, or an image. In other words, in another embodiment, the sensor 11 may be a gyrosensor, an inertia sensor, a force sensor, a laser tracker, a camera, a motion capture device, or the like.

As illustrated in FIG. 2, the robot mechanism unit 12 is a known robot manipulator including six joint axes J1 to J6 having servo motors (not illustrated) or the like; at least a world coordinate system C1 that is fixed in space, and a mechanical interface coordinate system C2 in a location of a flange 16, are defined. The three-axis acceleration detected by the sensor 11 is converted from a three-dimensional position in the mechanical interface coordinate system to a three-dimensional position in the world coordinate system by the control device 13 using a known method.

Figure 3:
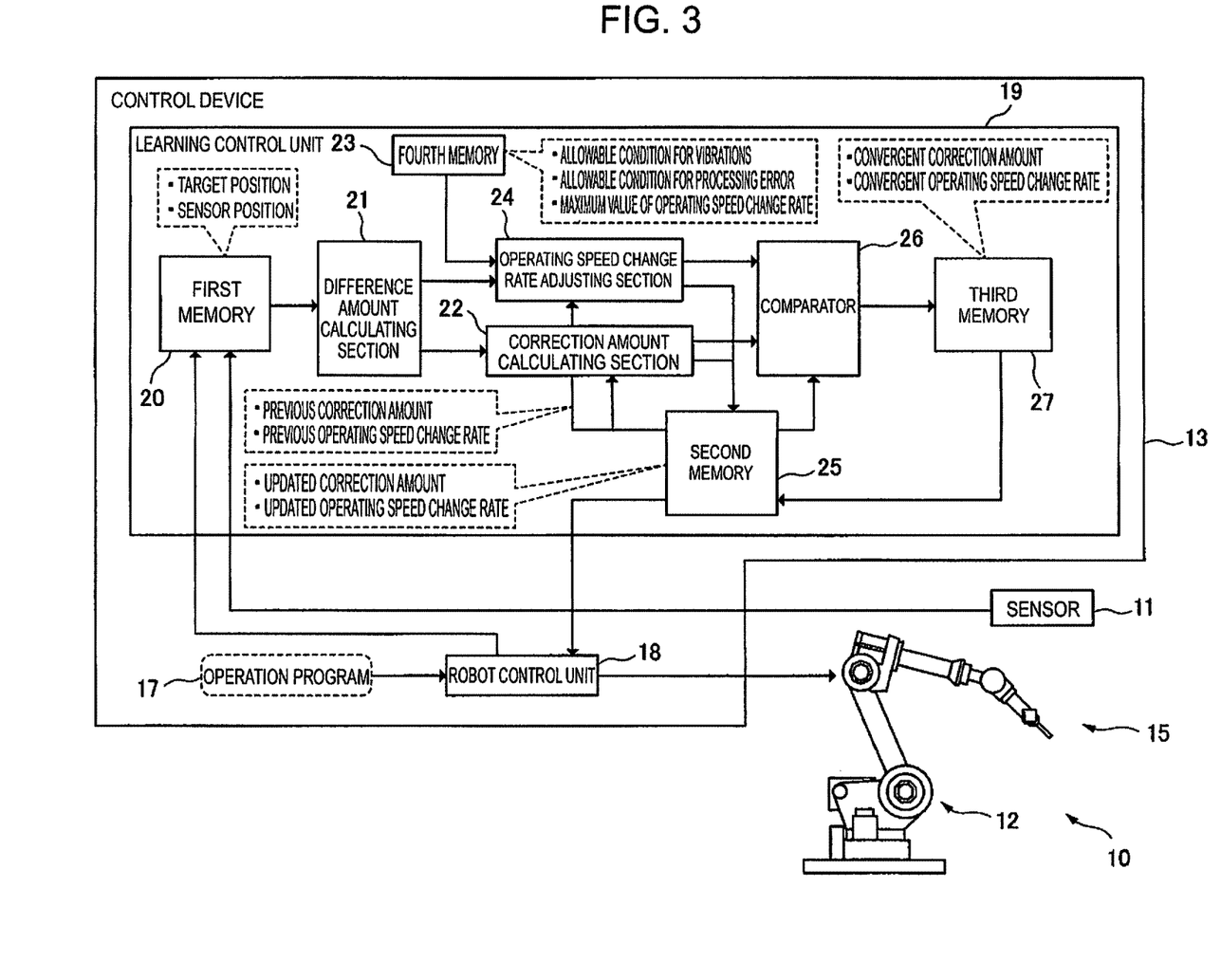
FIG. 3 is a block diagram of a control device according to one embodiment.

FIG. 3 is a block diagram of the control device 13 according to the present embodiment. As illustrated in FIG. 3, the control device 13 includes a robot control unit 18 that controls operations of the robot mechanism unit 12 in accordance with an operation program 17. The robot control unit 18 is supplied with operation commands from the operation program 17 pertaining to a target trajectory or a target position of the robot tip 15, and causes the servo motors (not illustrated) of the robot mechanism unit 12 to operate using the supplied operation commands. The operation commands may be any commands that can ultimately be converted into position commands pertaining to a target trajectory or a target position, and include commands constituted of three-axis positions, three-axis speeds, three-axis accelerations, and the like with respect to time, for example. The robot control unit 18 carries out position feedback control, speed feedback control, and current feedback control so that actual positions and speeds coincide with target positions and target speeds. However, even in a case where such control is carried out, vibrations occur in the robot tip 15 due to factors such as insufficient rigidity of reduction gears, of the robot arm, and the like when the operations of the robot 10 are accelerated, and this produces error from the target trajectories and the target positions. Accordingly, the control device 13 includes a learning control unit 19 that detects positional error using the sensor 11 attached to the robot tip 15 and carries out learning control of vibrations in the robot tip 15.

The learning control unit 19 starts learning upon a new operation pattern (a new target trajectory and target position), modifications to an operation pattern, and the like being taught. The learning control unit 19 includes a first memory 20 that stores a position of the robot tip 15 detected based on the sensor 11 (called a "sensor position") and the target position supplied to the robot control unit 18. The learning control unit 19 also includes a difference amount calculating section 21 that calculates an amount of difference between the sensor position and the target position stored in the first memory 20. Furthermore, the learning control unit 19 includes a correction amount calculating section 22 that, upon a vibration suppression effect having been learned from the above-described amount of difference (i.e., information including a current vibration component) and a previously-calculated correction amount for bringing the position of the robot tip 15 closer to the target position, calculates a new correction amount. The correction amount may be any value that can ultimately be converted into a position correction amount that brings the position of the robot tip 15 closer to the target position, and includes a correction amount constituted of a three-axis position, a three-axis speed, and a three-axis acceleration with respect to time, for example.

The learning control unit 19 further includes a fourth memory 23 that stores an allowable condition for processing error with respect to processing operations carried out in accordance with the operation program 17 (e.g., in the case of sealing, an allowable value for error in a seal flow amount of an adhesive), a maximum value of an operating speed change rate set in order to increase or reduce an operating speed of the robot mechanism unit 12, and an allowable condition for vibrations occurring in the robot tip 15 (e.g., allowable values for amplitude, settling time, and the like). The learning control unit 19 also includes an operating speed change rate adjusting section 24 that calculates, from the allowable condition for processing error stored in the fourth memory 23, an allowable condition for speed variations during the processing operations (e.g., an allowable rate for speed variations corresponding to "maximum speed/minimum speed"), and sets the operating speed change rate to be within the calculated allowable condition for speed variations, as well as adjusts the operating speed change rate to a new operating speed change rate by increasing or reducing a previous operating speed change rate within a range not exceeding the maximum value of the operating speed change rate and within a range of the allowable condition for vibrations. Additionally, the learning control unit 19 includes a second memory 25 that stores the new correction amount calculated by the correction amount calculating section 22 and the new operating speed change rate adjusted by the operating speed change rate adjusting section 24. The robot control unit 18 controls the operations of the robot mechanism unit 12 based on the new correction amount and the new operating speed change rate stored in the second memory 25.

On the other hand, the learning control unit 19 includes a comparator 26 that compares whether a ratio between the new correction amount and a previous correction amount, and a ratio between the new operating speed change rate and the previous operating speed change rate, are within respective predetermined ranges. In other words, the comparator 26 determines whether a convergence rate of the correction amount and a convergence rate of the operating speed change rate are within respective predetermined ranges (e.g., are equal to or more than 98%). The learning control unit 19 further includes a third memory 27 that stores a convergent correction amount and a convergent operating speed change rate. For the purpose of carrying out high-speed learning control, the first memory 20, the second memory 25, and the fourth memory 23 are preferably volatile memory such as DRAM; however, for the purpose of storing the convergent correction amount and the convergent operating speed change rate even after power has been cut off, the third memory 27 is preferably nonvolatile memory such as EEPROM. The convergent correction amount and the convergent operating speed change rate are read out to the second memory 25 after the power is turned on, and are reused by the robot control unit 18.

Furthermore, although not illustrated, the robot 10 may include at least one of the following: processing error condition input means that input the allowable condition for processing error and vibration condition input means that input the allowable condition for vibrations, for a teacher to store the allowable condition for processing error, allowable condition for vibrations, and the like in the fourth memory 23; cycle time condition input means that input an allowable condition for a learning cycle time (e.g., a cycle time target value); or learning condition input means that input another allowable condition used in the learning. A liquid crystal touch panel in a teach pendant (not illustrated), a keyboard, a mouse, and the like can be used as these condition input means.

Figure 4:
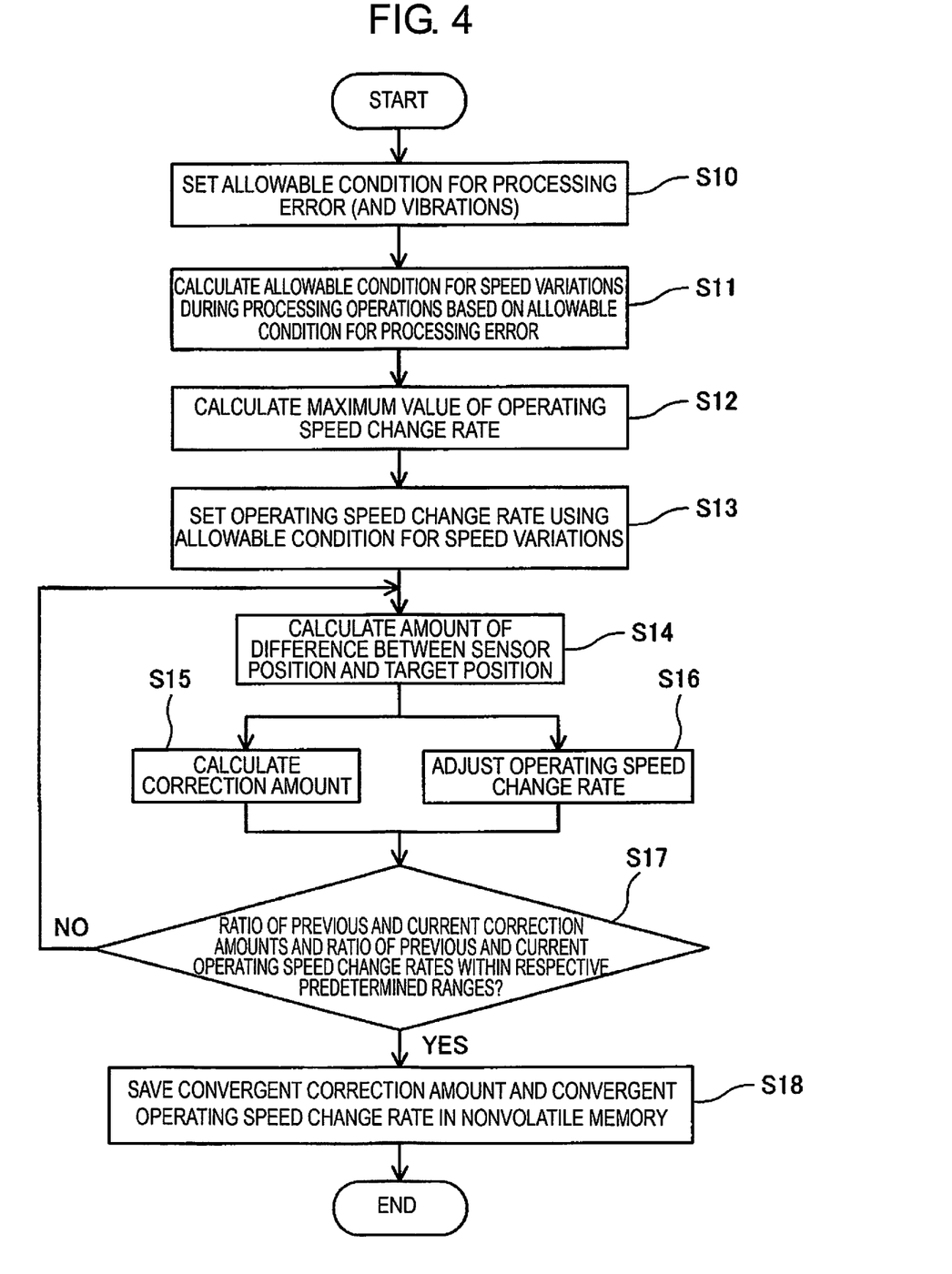
FIG. 4 is a flowchart illustrating a robot control method according to one embodiment.

FIG. 4 is a flowchart illustrating a robot control method according to the present embodiment. First, in step S10, the allowable condition for processing error for the processing operations to be carried out in accordance with the operation program are set by the teacher. The allowable condition for vibrations is also set by the teacher as necessary. In step S11, the allowable condition for speed variations during the processing operations is calculated from the allowable condition for processing error (i.e., the allowable rate for speed variations (rate$_{vel}$), corresponding to "maximum speed/minimum speed"). Refer to later descriptions for a specific example of calculating the allowable condition for speed variations.

The processes from step S12 and on are executed having caused the robot mechanism unit to operate by operation commands pertaining to a target trajectory or a target position of the control target. In step S12, a maximum value of a motor speed and a maximum value of a motor torque in each joint axis during the processing operations are stored as $\omega\_max_j$ and $\tau\_max_j$, respectively (where j is an axis number of each joint axis), and a maximum value $\alpha_{max}$ of an operating speed change rate $\alpha(s)$ that can be set for the operation pattern (or target trajectory) in question is calculated. Here, assuming an original operating speed is represented by vel(s) (where s is the position in the trajectory), the operating speed change rate $\alpha(s)$ is an indicator for operating such that the speed after the operating speed change rate is set reaches vel(s)×$\alpha(s)$. Considering that the motor speed is proportional to $\alpha(s)$ and the motor torque is proportional to the square of $\alpha(s)$ in this equation, a maximum value $\alpha_{max}$ of the allowable operating speed change rate is calculated from Equation 1 below. Here, $\omega\_alw_j$ and $\tau\_alw_j$ are an allowable value for the motor speed and an allowable value for the motor torque, respectively, of each joint axis.

$$\alpha_{max} = \min\left(\frac{\omega\_alw_j}{\omega\_max_j}, \sqrt{\frac{\tau\_alw_j}{\tau\_max_j}}\right)$$

In the robot control method according to the present embodiment, the maximum value of the operating speed change rate is calculated from the maximum value of the motor speed and the maximum value of the motor torque; however, in another embodiment, the robot 10 may include operating speed change rate maximum value input means that input the maximum value of the operating speed change rate, and the maximum value of the operating speed change rate may be set by the teacher manually.

In step S13, an operating speed during processing operations (vel(s), where s is the position in the trajectory), a maximum speed of vel(s) (vel$_{max}$), and a minimum speed of vel(s) (vel$_{min}$) are stored, and in accordance with Equation 2 below, the operating speed change rate $\alpha(s)$ is set so that the speed variation during the processing operations falls within the allowable condition for speed variations (rate$_{vel}$) calculated in step S11. Here, β has an initial value of 1.0, and is a constant value not dependent on a position s in the target trajectory.

$$\alpha(s)=\beta \times (\text{vel}_{min} \times (\text{vel}(s)-\text{vel}_{min}) \times (\text{rate}_{vel}-1)/(\text{vel}_{max}-\text{vel}_{min})+\text{vel}_{min})/\text{vel}(s)$$

In step S14, the operation program is executed at an operating speed based on a set operating speed change rate $\alpha(s)$, current vibrations are measured based on the sensor attached to the robot tip, and the amount of difference between the sensor position and the target position is calculated. In step S15, a new correction amount to be applied during a next operation is calculated having learned the vibration suppression effect based on a calculated amount of difference and the correction amount calculated previously to reduce the vibrations (to bring the position of the robot tip closer to the target position).

In step S16, in a case where vibrations measured currently are within an allowable value, the coefficient β of the operating speed change rate $\alpha(s)$ in Equation 2 is increased, whereas in a case where the vibrations measured currently exceed the allowable value, the operating speed change rate $\alpha(s)$ is adjusted by reducing the coefficient β of the operating speed change rate $\alpha(s)$, and a next operating speed is set. At this time, an upper limit of the operating speed change rate is restricted by the maximum value $\alpha_{max}$ of the operating speed change rate calculated according to Equation 1 (i.e., the coefficient β is restricted). In a case where the maximum value $\alpha_{max}$ of the operating speed change rate is calculated from the maximum value of the motor speed and the maximum value of the motor torque, the operating speed can be optimized having suppressed a load on the robot mechanism unit to less than or equal to an allowable value, in addition to the allowable condition for processing error and the allowable condition for vibrations.

In step S17, it is determined whether a ratio of the previous and current correction amounts and a ratio of the previous and current operating speed change rates are within the respective predetermined ranges. In other words, it is determined whether the correction amount and the coefficient β of the operating speed change rate are convergent. In a case where the correction amount and the coefficient β of the operating speed change rate are convergent (YES in step S17), the convergent correction amount and the convergent operating speed change rate are saved in the nonvolatile memory, and the learning ends. In a case where the correction amount and the coefficient β of the operating speed change rate are not convergent (NO in step S17), the process returns to step S14, and the learning from step S14 to step S17 is repeated until the correction amount and the coefficient β of the operating speed change rate converge.

Figure 5:
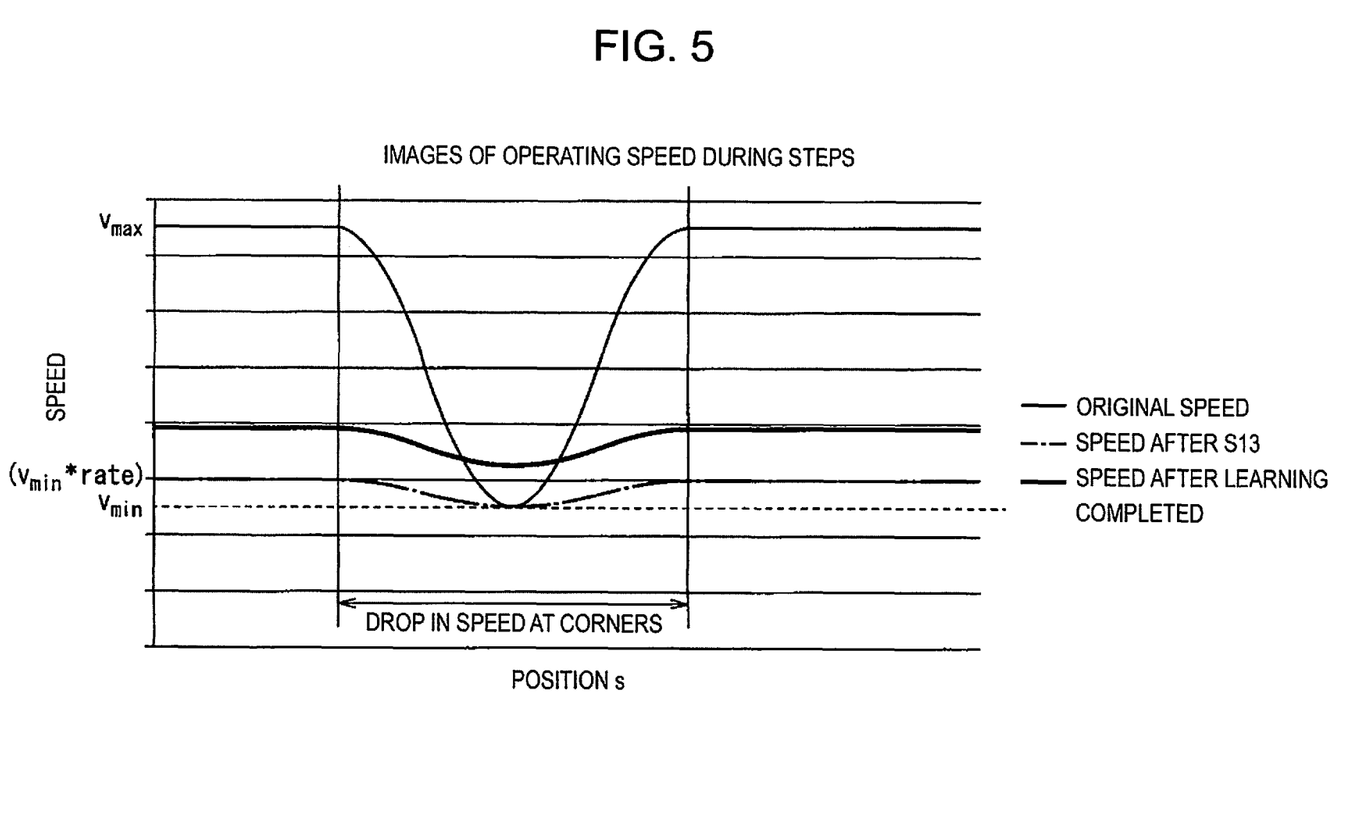
FIG. 5 is a conceptual diagram illustrating changes in operating speed in the steps illustrated in FIG. 4.

FIG. 5 is a conceptual diagram illustrating changes in the operating speed in the steps illustrated in FIG. 4. The original operating speed, represented by the regular solid line, is generally constant after the operating speed change rate has been set using the allowable condition for speed variations in step S13, as indicated by the single-dot-dash line. Furthermore, the operating speed after step S13, which is represented by the single-dot-dash line, becomes faster after the learning is completed in step S18, as indicated by the bold solid line. Accordingly, even in an application requiring a constant speed, the operations can be optimized with the vibration suppression effect obtained through learning in a range where the allowable condition for speed variations and the allowable condition for vibrations are met, without requiring trial and error on the part of the teacher.

An example of the robot control method described with reference to FIG. 4 and FIG. 5 will be given. In a case where, in a sealing operation constituted by linear movement and corner movement, the seal flow amount being constant is a requirement (in which case the speed of the robot being constant is a requirement), adhesive may be successfully applied with a uniform seal amount at linear parts; however, at corner parts having a small curvature, there are situations where the operating speed of the robot drops to ⅓ and three times the seal amount is applied. An image of the operating speed of the robot at this time corresponds to the "original speed" in FIG. 5. In a case where error in the seal amount is to be suppressed to ±9% on a production line, the allowable condition for processing error is set to ±9% by the teacher in step S10. To meet a processing precision of ±9%, it is necessary to suppress speed variations to ±9%, and thus the allowable rate of speed variations $rate_{vel}$ during the processing operations is calculated at 1.09/0.91=1.2 in step S11.

In step S13, the operating speed change rate is set so that the ratio of the speed variations falls within $rate_{vel}$. The operating speed after this setting corresponds to "speed after step S13" in FIG. 5. Then, by repeating the learning from step S14 to step S17, the operating speed is optimized (or increased) to simultaneously meet the allowable condition for processing error and the allowable condition for vibrations having suppressed vibrations. The operating speed after the optimization corresponds to "speed after learning completed" in FIG. 5. The operating speed after the learning is complete is generally constant, the operating speed is accelerated while suppressing vibrations, and the seal flow amount is generally constant.

As a further embodiment, although not illustrated, the robot 10 may include priority level input means that input a priority level for at least one of the allowable condition for processing error, the allowable condition for vibrations, or the allowable condition for the learning cycle time. Here, the priority level is an indicator, constituted by a numerical value, indicating that the allowable condition is relaxed for a condition with a higher numerical value. Furthermore, the robot 10 may include second allowable condition input means that input a second allowable condition indicating which allowable conditions can be relaxed and to what extent. A liquid crystal touch panel in a teach pendant (not illustrated), a keyboard, a mouse, and the like can be given as examples of these input means.

As one example, the allowable condition, the second allowable condition, and the priority level are set as follows.
processing error: "allowable condition=±10%; second allowable condition=±20%; priority level 2"
vibrations (maximum positional deviation): "allowable condition=1.0 mm; second allowable condition=2.0 mm; priority level 3"
learning cycle time: "allowable condition=60 seconds; second allowable condition=not set; priority level 1"

With such settings, in a case where the post-learning cycle time has become 70 seconds, the allowable condition for vibrations is gradually relaxed from 1.0 mm to 2.0 mm until the cycle time reaches 60 seconds, whereas the learning is continued while accelerating the operating speed by that amount. In a case where the cycle time still exceeds 60 seconds despite the allowable condition for vibrations being relaxed to 2.0 mm, the learning is continued while relaxing the allowable condition for processing error from ±10% to ±20%. In a case where the cycle time still exceeds 60 seconds despite the allowable condition for processing error being relaxed to ±20%, the teacher may set the second allowable condition again and continue the learning. Additionally, in a case where the priority level of the allowable condition for processing error and the priority level of the allowable condition for vibrations are the same value (e.g., "2") when making such settings, the learning may be continued while gradually relaxing the allowable condition for processing error and the allowable condition for vibration at the same rate. According to this further embodiment, learning is continued even when the allowable conditions are not met, which makes it possible to prevent downtime in the processing operations.

According to the present embodiment, the calculation of the correction amount and the adjustment of the operating speed change rate for suppressing vibrations are repeated within a range in which the allowable condition for speed variations and the allowable condition for vibrations during processing operations, calculated from the allowable condition for processing error with respect to the processing operations of the robot, are met; as such, learning control can be carried out for vibrations occurring at the control target while accelerating the operating speed of the robot without requiring trial and error on the part of the teacher, even in applications requiring constant speeds.

The invention claimed is:

1. A robot, comprising:
a robot mechanism unit provided with a sensor for detecting a position of a control target; and
a control device configured to control an operation of the robot mechanism unit in accordance with an operation program taught to carry out the operation at a constant speed,
wherein the control device comprises a learning control unit configured to
cause the robot mechanism unit to operate according to an operation command pertaining to a target trajectory or a target position of the control target, and
carry out learning of calculating an amount of difference between the position of the control target detected based on the sensor and the target position and calculating a new correction amount based on the amount of difference and a correction amount previously calculated for bringing the position of the control target closer to the target position, and wherein the learning control unit comprises:
   an operating speed change rate adjusting section configured to
      store a maximum speed and a minimum speed caused by limitations of the robot mechanism unit during a processing operation to be carried out in accordance with the operation program,
      calculate an allowable condition for speed variations corresponding to a ratio between the maximum speed and the minimum speed,
      set an operating speed change rate to increase or reduce an operating speed of the robot mechanism unit based on the calculated allowable condition for speed variations and the stored maximum speed and minimum speed, and
      adjust the operating speed change rate within a range not exceeding a maximum value of the operating speed change rate and within a range of an allowable condition for vibrations occurring in the control target; and
   a correction amount calculating section configured to calculate the new correction amount to suppress the vibrations in the operating speed change rate.

2. The robot of claim 1, wherein the operating speed change rate adjusting section is configured to calculate the allowable condition for speed variations based on an allowable condition for processing error in the processing operation carried out in accordance with the operation program.

3. The robot of claim 2, further comprising means for inputting the allowable condition for processing error.

4. The robot of claim 1, further comprising means for inputting the allowable condition for vibrations.

5. The robot of claim 1, wherein the learning control unit is configured to calculate the maximum value of the operating speed change rate based on a maximum speed and a maximum acceleration allowed by the robot mechanism unit.

6. The robot of claim 2, further comprising means for inputting a priority level for at least one of the allowable condition for processing error, the allowable condition for vibrations, or an allowable condition for a cycle time of the learning,
   wherein the learning control unit, in a case where any allowable condition is not met, is configured to continue the learning while relaxing the allowable conditions in accordance with the priority level.

7. The robot of claim 1, wherein the sensor is an accelerometer, a gyrosensor, an inertia sensor, a force sensor, a laser tracker, a camera, or a motion capture device.

8. The robot of claim 1, further comprising a memory configured to, after the correction amount and the operating speed change rate have converged, store a convergent correction amount and a convergent operating speed change rate.

9. The robot of claim 1, wherein the control device further comprises a robot control unit configured to control the operation of the robot mechanism unit based on the supplied operation command and the new correction amount calculated by the learning control unit.

10. A robot, comprising:
   a robot mechanism unit provided with a sensor for detecting a position of a control target; and
   a control device having a learning control unit and configured to control an operation of the robot mechanism unit in accordance with an operation program, and
   means for inputting a priority level for at least one of an allowable condition for processing error, an allowable condition for vibrations, or an allowable condition for a cycle time of learning,
   wherein the learning control unit comprises:
      an operating speed change rate adjusting section configured to calculate an allowable condition for speed variations during a processing operation based on the allowable condition for processing error, and adjust an operating speed change rate of the robot mechanism unit based on the calculated allowable condition for speed variations within a range of the allowable condition for vibrations; and
      a correction amount calculating section configured to calculate a correction amount to suppress the vibrations in the adjusted operating speed change rate,
   wherein the learning control unit, in a case where any allowable condition is not met, is configured to continue the learning while relaxing the allowable conditions based on the priority level.

11. A control method of a robot, the robot comprising: a robot mechanism unit provided with a sensor for detecting a position of a control target and a control device configured to control an operation of the robot mechanism unit in accordance with an operation program taught to carry out the operation at a constant speed, the control method comprising:
   causing the robot mechanism unit to operate according to an operation command pertaining to a target trajectory or a target position of the control target;
   storing a maximum speed and a minimum speed caused by limitations of the robot mechanism unit during a processing operation to be carried out in accordance with the operation program;
   calculating an allowable condition for speed variations corresponding to a ratio between the maximum speed and the minimum speed;
   setting an operating speed change rate to increase or reduce an operating speed of the robot mechanism unit, based on the calculated allowable condition for speed variations and the stored maximum speed and minimum speed;
   calculating an amount of difference between the position of the control target detected based on the sensor and the target position;
   adjusting the operating speed change rate within a range not exceeding a maximum value of the operating speed change rate and within a range of an allowable condition for vibrations occurring in the control target; and
   carrying out learning of calculating a new correction amount based on the amount of difference and a correction amount previously calculated to suppress the vibrations in the operating speed change rate.

\* \* \* \* \*